(12) United States Patent
Chuang et al.

(10) Patent No.: US 11,718,002 B2
(45) Date of Patent: Aug. 8, 2023

(54) METHOD FOR MANUFACTURING CAR ROLLER SHUTTER DOOR

(71) Applicant: DONGGUAN HIROCA AUTOMOTIVE TRIM TECHNOLOGY CO., LTD, Guangdong Province (CN)

(72) Inventors: Wu Chuan Chuang, Hsinchu (TW); Shuming Lee, Hsinchu County (TW)

(73) Assignee: DONGGUAN HIROCA AUTOMOTIVE TRIM TECHNOLOGY CO., LTD, Guangdong Province (CN)

( * ) Notice: Subject to any disclaimer, the term of this patent is extended or adjusted under 35 U.S.C. 154(b) by 142 days.

(21) Appl. No.: 17/385,915

(22) Filed: Jul. 27, 2021

(65) Prior Publication Data
US 2022/0024090 A1    Jan. 27, 2022

(30) Foreign Application Priority Data
Jul. 27, 2020    (CN) .......................... 202010730399.4

(51) Int. Cl.
| | |
|---|---|
| *B29C 45/16* | (2006.01) |
| *B29C 45/14* | (2006.01) |
| *B29L 31/30* | (2006.01) |

(52) U.S. Cl.
CPC .... *B29C 45/1618* (2013.01); *B29C 45/14508* (2013.01); *B29L 2031/3005* (2013.01)

(58) Field of Classification Search
CPC ...................... B29C 45/1618; B29C 45/14508
See application file for complete search history.

(56) References Cited

FOREIGN PATENT DOCUMENTS

| CN | 207449717 | * 6/2018 |
|---|---|---|
| CN | 110435173 | 11/2019 |

(Continued)

OTHER PUBLICATIONS

"Office Action of Taiwan Counterpart Application", dated Mar. 3, 2022, p. 1-p. 8.

(Continued)

*Primary Examiner* — Edmund H Lee
(74) *Attorney, Agent, or Firm* — JCIPRNET

(57) ABSTRACT

The invention relates to a technical field of car roller shutter door production, in particular to a method for manufacturing a car roller shutter door. A single film piece is firstly vacuum formed into a desired shape, and then rubber is injected into the film piece after vacuum forming, so that the rubber and the film piece are integrally formed to form a single roller shutter strip, and then a required number of single roller shutter strips are placed and laminated on a flexible substrate in an integrated and orderly manner to form a car roller shutter door. Each of roller shutter strips is independent of each other and does not interfere or affect each other, which improves flexibility of the car roller shutter door. Compared with long strips of whole film sheet on the car roller shutter door in the prior art, each of film pieces of the present invention is independent of each other and does not have defect of easy fracture of the whole film sheet, which makes service life long. In addition, production of the single film piece is less expensive and more efficient, and pattern design is flexible. When one of the roller shutter strips is damaged, only the damaged roller shutter strip needs to be replaced in a targeted manner, avoiding the waste of resources and reducing maintenance costs.

9 Claims, 1 Drawing Sheet

(56) References Cited

FOREIGN PATENT DOCUMENTS

| | | | |
|---|---|---|---|
| CN | 110435179 | | 11/2019 |
| CN | 112046374 | * | 12/2020 |
| CN | 213292161 | * | 5/2021 |
| DE | 4003359 | * | 9/1991 |
| DE | 10311793 | | 12/2004 |
| DE | 102015016011 | | 6/2017 |
| TW | 087814 | | 6/1987 |

OTHER PUBLICATIONS

"Search Report of Europe Counterpart Application", dated Dec. 22, 2021, pp. 1-7.

* cited by examiner

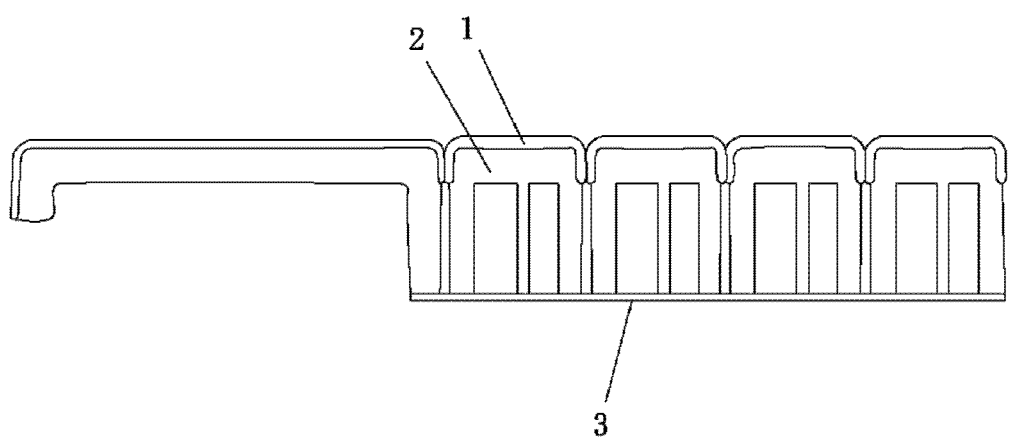

METHOD FOR MANUFACTURING CAR ROLLER SHUTTER DOOR

CROSS-REFERENCE TO RELATED APPLICATION

This application claims the priority benefit of China application serial no. 202010730399.4, filed on Jul. 27, 2020. The entirety of the above-mentioned patent application is hereby incorporated by reference herein and made a part of this specification.

BACKGROUND

Technical Field

The invention relates to a technical field of car roller shutter door production, in particular to a method for manufacturing a car roller shutter door.

Description of Related Art

Traditional car roller shutter doors are made of hard rubber and soft rubber. The specific manufacturing method is as follows: firstly, the hard rubber is injection molded, and then the hard rubber is embedded in the injection mold. The injection molding machine clamps the mold and injects the soft rubber into the injection mold. The soft rubber and hard rubber are injected into one, and finally the injection molding machine opens the mold and the injection molded product is taken out. Because the surface of soft rubber (TPE, a thermoplastic elastomer material) is relatively smooth, it is difficult to texture, add patterns and create textures on the surface of soft rubber, while the surface of soft rubber does not achieve a high-gloss effect, and soft rubber is easy to fall off from hard rubber. In order to solve the above problem, the existing technology also has a long strip of the whole film sheet placed in the injection mold, and the injection molding machine injects the rubber onto the film sheet, which is integrally molded with the rubber to form the car roller shutter door. However, the flexibility of the car roller shutter door manufactured in this method is poor, and the long strip of the whole piece of film sheet is easy to crack, resulting in a short service life of the car roller shutter door. In addition, the volume of the required injection mold is large, the precision of the injection mold is required to be high, the mold is difficult to manufacture, and the manufacturing cost is high. Therefore, the defects are very obvious and there is an urgent need to provide a solution.

SUMMARY

In order to solve the above technical problems, the object of the present invention is to provide a method for manufacturing a car roller shutter door. Each of roller shutter strips on the car roller shutter door is independent of each other and does not interfere or affect each other, which improves flexibility of the car roller shutter door. Compared with long strips of whole film sheet on the car roller shutter door in the prior art, each of film pieces of the present invention is independent of each other and does not have defect of easy fracture of the whole film sheet, which makes service life of the car roller shutter door long. In addition, production of a single film piece is less expensive and more efficient than production of a whole film piece, making it easier to design different colors, texture, and patterns on different film pieces. When one of the roller shutter strips is damaged, only the damaged roller shutter strip needs to be replaced in a targeted manner, without the need to replace the entire car roller shutter door, and the maintenance is convenient and fast, avoiding the waste of resources and reducing maintenance costs.

In order to achieve the above objectives, the present invention adopts the following technical solutions.

A method for manufacturing a car roller shutter door including the following steps.

Step (1): A single film piece is injection molded through a first injection mold, or a film sheet is injection molded through a first injection mold, and then the film sheet is cut according to desired specification through a cutting mechanism to form a single film piece.

Step (2): the film piece is heated to soften the film piece.

Step (3): the softened film piece is subjected to a vacuum forming and molding processing through a vacuum forming method to mold the film piece into a desired shape, in which a bottom surface of the film piece is recessed with a groove.

Step (4): the film piece after vacuum forming and molding is placed in a second injection mold, in which an injection molding machine drives the second injection mold to clamp mold and injects molten rubber into the second injection mold, so that the molten rubber and the film piece are integrally formed in the second injection mold, so that the bottom surface of the film piece is connected with a rubber piece protruding into the groove of the film piece to form a roller shutter strip.

Step (5): the roller shutter strip is removed after the injection molding machine drives the second injection mold to open mold.

Step (6): a flexible substrate is provided, and a required number of roller shutter strips are placed and laminated on the flexible substrate in a neat and orderly manner, in which a side of the rubber piece away from the film piece is laminated to the flexible substrate to form the car roller shutter door.

Further, the film piece from top to bottom includes a hardened protective film layer, a pattern layer and a base layer.

Further, in Step (4), a required number of film pieces are placed in the second injection mold in a neat and orderly manner, and after the second injection mold is clamped, the injection molding machine injects the molten rubber onto all the film pieces in the second injection mold to produce multiple roller shutter strips at one time.

Further, the flexible substrate is a non-woven fabric.

Further, in Step (6), the required number of roller shutter strips are laminated to the flexible substrate to form the car roller shutter door by means of laminating adhesive.

Further, Step (6) further includes the following steps. A press-fit device is provided. The car roller shutter door is placed in the press-fit device. The car roller shutter door is press-fit by the press-fit device.

Further, in Step (1), the cutting mechanism includes a cutting knife movably disposed in the first injection mold and a cutting drive for driving a movement of the cutting knife. The cutting drive is configured to drive the cutting knife to move relative to the first injection mold, and the moving cutting knife cuts the film sheet injection molded by the first injection mold to form the single film piece.

Further, in the car roller shutter door, a gap between two adjacent roller shutter strips is 0.2 mm to 0.4 mm.

Further, in Step (4), after injection molding of the rubber piece and a film, coolant is introduced into a cooling channel of the second injection mold, after cooling of the roller shutter strip in second injection mold to 75° C.~85° C., the coolant is stopped introducing into the cooling channel, and the roller shutter strip is naturally cooled in the second injection mold for 5S~8S before entering Step (5).

Beneficial effects of the present invention: a single film piece is firstly vacuum formed into a desired shape, and then the molten rubber is injected into the film piece after vacuum forming, so that the rubber and the film piece are integrally formed to form a single roller shutter strip, and then a required number of single roller shutter strips are placed and laminated on the flexible substrate in a neat and orderly manner to form a car roller shutter door. Each of roller shutter strips on the car roller shutter door is independent of each other and does not interfere or affect each other, which improves flexibility of the car roller shutter door. Compared with long strips of whole film sheet on the car roller shutter door in the prior art, each of film pieces of the present invention is independent of each other and does not have defect of easy fracture of the whole film sheet, which makes service life of the car roller shutter door long. In addition, production of the single film piece is less expensive and more efficient than production of a whole film piece, and the required precision of the injection mold is relatively low, which reduces the difficulty of manufacturing the injection mold and the cost of manufacturing the injection mold, and makes it easier to design different colors, texture, and patterns on different film pieces. When one of the roller shutter strips is damaged, only the damaged roller shutter strip needs to be replaced in a targeted manner, without the need to replace the entire car roller shutter door, and the maintenance is convenient and fast, avoiding the waste of resources and reducing maintenance costs.

To make the aforementioned more comprehensible, several embodiments accompanied with drawings are described in detail as follows.

BRIEF DESCRIPTION OF THE DRAWINGS

The accompanying drawing is included to provide a further understanding of the disclosure, and is incorporated in and constitute a part of this specification. The drawing illustrates exemplary embodiments of the disclosure and, together with the description, serves to explain the principles of the disclosure.

FIG. 1 is a schematic diagram of a structure of a car roller shutter door according to an embodiment.

DESCRIPTION OF THE EMBODIMENTS

In order to facilitate the understanding of those skilled in the art, the present invention will be further described below in conjunction with the embodiments and the drawings, and the content mentioned in the embodiments does not limit the present invention.

As shown in FIG. 1, the present invention provides a method for manufacturing a car roller shutter door, which includes the following steps.

Step (1): A single film piece 1 is injection molded through a first injection mold, or a film sheet is injection molded through a first injection mold, and then the film sheet is cut according to desired specification through a cutting mechanism to form a single film piece 1.

Step (2): a single or multiple film pieces 1 are heated to soften the film pieces 1.

Step (3): the softened film piece 1 is subjected to a vacuum forming and molding processing through a vacuum forming method to mold the film piece 1 into a desired shape, in which the film piece 1 after vacuum forming and molding has a shape of inverted U with square angle, and a bottom surface of the film piece is recessed with a groove.

Step (4): the film piece 1 after vacuum forming and molding is placed in a second injection mold, in which an injection molding machine drives the second injection mold to clamp mold and injects molten rubber into the second injection mold, so that the molten rubber and the film piece 1 are integrally formed in the second injection mold, so that a bottom surface of the film piece 1 is connected with a rubber piece 2 protruding into the groove of the film piece to form a single roller shutter strip.

Step (5): the roller shutter strip is removed after the injection molding machine drives the second injection mold to open mold (open).

Step (6): a flexible substrate 3 is provided, and a required number of roller shutter strips are placed and laminated on the flexible substrate 3 in a neat and orderly manner, in which a side of the rubber piece 2 away from the film piece 1 is laminated to the flexible substrate 3 to form the car roller shutter door.

In the present invention, a single film piece 1 is firstly vacuum formed into a desired shape, and then the molten rubber is injected into the film piece 1 after vacuum forming, so that the rubber and the film piece 1 are integrally formed to form a single roller shutter strip, and then a required number of single roller shutter strips are placed and laminated on a flexible substrate 3 in a neat and orderly manner to form a car roller shutter door. Each of roller shutter strips on the car roller shutter door is independent of each other and does not interfere or affect each other, which improves flexibility of the car roller shutter door. Compared with long strips of whole film sheet on the car roller shutter door in the prior art, each of film pieces 1 of the present invention is independent of each other and does not have defect of easy fracture of the whole film sheet, which makes service life of the car roller shutter door long. In addition, production of the single film piece 1 is less expensive and more efficient than production of a whole film piece, and the required precision of the injection mold is relatively low, which reduces the difficulty of manufacturing the injection mold and the cost of manufacturing the injection mold, and makes it easier to design different colors, texture, and patterns on different film pieces 1, and to print flexibly. When one of the roller shutter strips is damaged, only the damaged roller shutter strip needs to be replaced in a targeted manner, without the need to replace the entire car roller shutter door, and the maintenance is convenient and fast, avoiding the waste of resources and reducing maintenance costs.

In this embodiment, the film piece 1 from top to bottom includes a hardened protective film layer, a pattern layer and a base layer. The hardened protective film layer is made of PMMA material, and the base layer is made of materials such as ABS or PC. The pattern layer can be processed such as texturing, adding patterns and manufacturing lines, and a surface of the film piece 1 can show different patterns and colors to increase diversity of the film piece 1. The hardened protective film layer can prevent the pattern layer from being scratched, while the hardened protective film layer is made of PMMA material, which has the advantages of better transparency, chemical stability, mechanical properties and weather resistance, easy dyeing, easy processing, beautiful appearance, etc. The hardened protective film layer makes the surface of the film piece 1 achieve a high-gloss effect. When the base layer is made of ABS material, the ABS material has the characteristics of easy molding process, low shrinkage rate and strong dimensional stability, etc. After the film piece 1 and the rubber piece 2 are injection molded into a whole, the rubber piece 2 adheres firmly to the base layer, so that the film piece 1 is not easy to fall off from the rubber piece 2.

In this embodiment, in Step (4), a required number of film pieces 1 are placed in the second injection mold in a neat and orderly manner, and after the second injection mold is clamped, the injection molding machine injects the molten rubber onto all the film pieces 1 in the second injection mold to produce multiple roller shutter strips at one time, improving efficiency of manufacturing the roller shutter strips.

In this embodiment, the flexible substrate 3 is a non-woven fabric, which improves the flexibility of the car roller shutter door and extends the service life of the car roller shutter door.

In this embodiment, in Step (6), the required number of roller shutter strips are laminated to the flexible substrate 3 to form the car roller shutter door by means of laminating adhesive, so that the roller shutter strips can be firmly attached to the flexible substrate 3, ensuring quality of the car roller shutter door.

In this embodiment, Step (6) further includes the following steps. A press-fit device is provided. The car roller shutter door is placed in the press-fit device. The car roller shutter door is press-fit by the press-fit device. Stability of connection between the roller shutter strip and the flexible substrate 3 is further improved.

In this embodiment, in Step (1), the cutting mechanism includes a cutting knife movably disposed in the first injection mold and a cutting drive for driving a movement of the cutting knife. The cutting drive is configured to drive the cutting knife to move relative to the first injection mold, and the moving cutting knife cuts the film sheet injection molded by the first injection mold to form the single film piece 1. After the film sheet is injection molded by the first injection mold, the cutting knife cuts the film sheet directly inside a mold cavity of the first injection mold, eliminating the need to move the film sheet outside the first injection mold for secondary positioning and cutting, improving the film sheet cutting yield and cutting efficiency.

In this embodiment, in the car roller shutter door, a gap between two adjacent roller shutter strips is 0.2 mm to 0.4 mm. The gap is designed to facilitate the car roller shutter door in a circular rotation.

In this embodiment, in Step (4), after injection molding of the rubber piece and a film, coolant is introduced into a cooling channel of the second injection mold, after cooling of the roller shutter strip in second injection mold to 75° C.~85° C., the coolant is stopped introducing into the cooling channel, and the roller shutter strip is naturally cooled in the second injection mold for 5S~8S before entering Step (5). The two-stage cooling method is used to avoid warping and deformation due to the rapid cooling of the rubber piece 2, which ensures quality of the roller shutter strip.

All the technical features in this embodiment can be freely combined according to actual needs.

The above embodiment is a better implementation of the present invention. In addition, the present invention can also be implemented in other ways, and any obvious substitution without departing from the concept of the technical solution is within the protection scope of the present invention.

What is claimed is:

1. A method for manufacturing a car roller shutter door comprising:
    Step (1): injection molding a single film piece through a first injection mold, or injection molding a film sheet through a first injection mold, and then cutting the film sheet according to desired specification through a cutting mechanism to form a single film piece;
    Step (2): heating the film piece to soften the film piece;
    Step (3): subjecting the softened film piece to a vacuum forming and molding processing through a vacuum forming method to mold the softened film piece having a desired shape, wherein a bottom surface of the softened film piece is recessed with a groove;
    Step (4): placing the film piece after vacuum forming and molding in a second injection mold, wherein an injection molding machine drives the second injection mold to clamp mold and injects molten rubber into the second injection mold, such that the injected molten rubber and the placed film piece are integrally formed in the second injection mold, such that the bottom surface of the placed film piece is connected with a rubber piece protruding into the groove of the placed film piece to form a roller shutter strip;
    Step (5): removing the roller shutter strip after the injection molding machine drives the second injection mold to open mold;
    Step (6): providing a flexible substrate, and placing and laminating a required number of roller shutter strips on the flexible substrate in a neat and orderly manner, wherein a side of the rubber piece away from the film piece is laminated to the flexible substrate to form the car roller shutter door.

2. The method for manufacturing a car roller shutter door according to claim 1, wherein the film piece from top to bottom comprises a hardened protective film layer, a pattern layer and a base layer.

3. The method for manufacturing a car roller shutter door according to claim 1, wherein in Step (4), a required number of film pieces are placed in the second injection mold in a neat and orderly manner, and after the second injection mold is clamped, the injection molding machine injects the molten rubber onto all the film pieces in the second injection mold to produce a plurality of roller shutter strips at one time.

4. The method for manufacturing a car roller shutter door according to claim 1, wherein the flexible substrate is a non-woven fabric.

5. The method for manufacturing a car roller shutter door according to claim 1, wherein in Step (6), the required number of roller shutter strips are laminated to the flexible substrate to form the car roller shutter door by means of laminating adhesive.

6. The method for manufacturing a car roller shutter door according to claim 5, wherein Step (6) further comprises: providing a press-fit device, placing the car roller shutter door in the press-fit device, wherein the car roller shutter door is press-fit by the press-fit device.

7. The method for manufacturing a car roller shutter door according to claim 1, wherein in Step (1), the cutting mechanism comprises a cutting knife movably disposed in the first injection mold and a cutting drive for driving a movement of the cutting knife, the cutting drive is configured to drive the cutting knife to move relative to the first injection mold, and the moving cutting knife cuts the film sheet injection molded by the first injection mold to form the single film piece.

8. The method for manufacturing a car roller shutter door according to claim 1, wherein in the car roller shutter door, a gap between two adjacent roller shutter strips is 0.2 mm to 0.4 mm.

9. The method for manufacturing a car roller shutter door according to claim 1, wherein in Step (4), after injection molding of the rubber piece and a film, coolant is introduced into a cooling channel of the second injection mold, after cooling of the roller shutter strip in second injection mold to 75° C.~85° C., the coolant is stopped introducing into the cooling channel, and the roller shutter strip is naturally cooled in the second injection mold for 5S~8S before entering Step (5).

* * * * *